United States Patent [19]
Suwanda

[11] Patent Number: 5,863,480
[45] Date of Patent: Jan. 26, 1999

[54] PROCESS FOR MAKING A FILLER REINFORCED THERMOPLASTIC COMPOSITES HAVING BIAXIALLY ORIENTED COMPONENTS

[75] Inventor: Dedo Suwanda, Toronto, Canada

[73] Assignee: SRP Industries Ltd., Markham, Canada

[21] Appl. No.: 297,153

[22] Filed: Aug. 29, 1994

[51] Int. Cl.$^6$ .................................................. B29C 47/92
[52] U.S. Cl. ................. 264/209.8; 264/165; 264/171.26; 264/176.1; 264/209.1; 264/710.2
[58] Field of Search ................................ 264/40.2, 40.6, 264/40.7, 165, 171.26, 176.1, 209.1, 209.5, 209.8, 210.2

[56] References Cited

U.S. PATENT DOCUMENTS

| | | |
|---|---|---|
| 3,764,642 | 10/1973 | Boutillier . |
| 4,053,270 | 10/1977 | Collier et al. . |
| 4,734,240 | 3/1988 | Chung et al. . |
| 4,801,419 | 1/1989 | Ward et al. . |
| 5,096,634 | 3/1992 | Tsadares et al. . |

FOREIGN PATENT DOCUMENTS

| | | |
|---|---|---|
| 0 213 663 A1 | 3/1987 | European Pat. Off. . |
| 3801 574 A1 | 8/1989 | Germany . |
| 56 161 126 | 12/1981 | Japan . |
| WO 92/11125 | 7/1992 | WIPO . |

OTHER PUBLICATIONS

A. Selwood, B. Parsons, I.M. Ward, *The production and properties of die–drawn polyethylene*, Plastics and Rubber Processing and Application, vol. 11, No. 4, 1989.

A. Selwood, A.K. Taraiya, I.M. Ward, *The preparation and properites of die–drawn polyvinylchloride tubes*, Plastics and Rubber Processing and Application, vol. 10, No. 2, 1988.

A. Selwood, I.M. Ward, G. Craggs, *The drawing behaviour of polyethylene terephthalate tube*, Plastics and Rubber Processing and Application, vol. 10, No. 2, 1988.

C.C. Morath, A.K. Taralya, A. Richardson, G. Craggs, I.M. Ward, *The development of continuous large–scale die drawing for the production of oriented polymer rods and tubes*, Plastics and Rubber Processing and Application, vol. 10, No. 2, 1988.

A.K. Taralya, I.M. Ward, *The production and properties of die–drawn biaxially oriented polypropylene tubes*, Plastics and Rubber Processing and Application, vol. 10, No. 2, 1988.

Dr. B. Procter, *Analysis for extrusion die design*, SPE ANTEC 211–218 (1971).

Dr. C.E. Anastassakis, *Biaxially oriented rigid PVC pipes*, Interraltions between Processing Structure and Properties of Polymer Materials, edited by J.C. Seferis and P.S. Teocaris, 1984.

*Overseas Report, From the current Modern Plastics International*, Modern Plastics, May 1988.

Karen Lindsay, *Downstream engineering increases process flexibility*, Modern Plastics, Mar. 1993.

*Primary Examiner*—Richard Weisberger
*Attorney, Agent, or Firm*—Nancy E. Hill; Lynn C. Schumacher; Hill & Schumacher

[57] ABSTRACT

There is disclosed a process and apparatus for the continuous production of a thermoplastic product having biaxially oriented components. Preferably the thermoplastic compound includes filler. The process may be used to manufacture hollow profiles or sheets. The product is made by a continuous extrusion process which biaxially orients the components by forcing a molten thermoplastic compound through a contoured die with a contoured mandrel therein and then cooling the compound to preserve the imparted orientation. With respect to the sheets a biaxially oriented hollow profile is formed, then cut along the axial direction and then flattened into a sheet.

13 Claims, 7 Drawing Sheets

PROCESS FOR MAKING A FILLER REINFORCED THERMOPLASTIC COMPOSITES HAVING BIAXIALLY ORIENTED COMPONENTS

FIELD OF THE INVENTION

The present invention relates to processes and apparatus for the manufacture of filler reinforced thermoplastic composite materials with biaxially oriented polymer components. The products formed by the present invention can be of hollow profiles or sheets.

BACKGROUND OF THE INVENTION

It is well known that the properties of thermoplastic polymers and thermoplastic/filler composite material can be enhanced by orienting the thermoplastic molecules and filler (when present). Further, for certain applications it is desirable to orient the molecules and filler in two directions. Accordingly much research has been directed towards developing methods for producing such products.

One method proposed for producing biaxially oriented products is solid state extrusion. For example U.S. Pat. No. 4,801,419 (Ward et al., 1989) and Ward et al., Plast. Rub. Comp. Proc. Appl. 19 (1993) describe a process to produce uniaxially and biaxially oriented hollow profiles by deforming a pre-extruded, unoriented hollow workpiece comprising orientable, thermoplastic polymer by passage in the solid phase through a die having both an entry and an exit side. The hollow workpiece is provided at the entry side of the die, while tension is applied to the hollow workpiece from the exit side of the die. Two important elements disclosed in these publications are the temperature of the polymer during deformation and the drawing or tension applied to cause this deformation. The temperature must be well below the melting point of the polymer, thus, the deformation of polymer took place in the solid phase. The tension applied must be high enough to cause solid state deformation but low enough so as not to cause tensile failure. A special grip is needed to hold and pull the workpiece from the exit side of the die. As the result, this process is a batch process.

A similar process is described in U.S. Pat. No. 5,096,634 (Tsadares and Anastassakis, 1992) which describes a process for producing biaxially stretched, unfilled thermoplastic tube (especially polyvinylchloride) by steps of extruding an unoriented thermoplastic tube through a die in the melt/viscous state, cooling the tube and drawing it at the same speed as the extrusion speed, passing the tube next over a conical expanding portion of a stretching mandrel (a second die) and drawing the expanded tubing at the exit at a speed higher than the entering speed, thus, biaxially stretch the tube. The stretching is resulted from the differences in the drawing speed of the tubing before and after the conical die.

It is desired to produce hollow profiles or sheet with increased mechanical strength properties in two directions, where the strength properties in both directions can be designed or engineered according to the desired needs. It is also desirable to produce these superior products continuously using commercially available equipment at a cost comparable to or lower than existing products.

SUMMARY OF THE INVENTION

In accordance with the present invention, it has been found that fibre and particulate reinforced thermoplastics of any molecular weight of exceptionally high strength and modulus in two directions (biaxially oriented), can be made by extrusion processes which biaxially (in two directions) orient the thermoplastic polymeric chains and the fibrous filler/particulate having an aspect ratio greater than unity during extrusion, and which freeze them in that orientation, substantially preventing relaxation of polymeric chain. In this process, the extruder is responsible for pushing the composite material through the die assembly, thus creating biaxial orientation. Application of tension at the exit side of the die must be avoided because the composite material has very low tensile strength at the processing condition due to high filler content.

The present invention provides a process for the continuous production of a thermoplastic product having biaxially oriented components. The process comprises the steps of providing a thermoplastic compound comprising thermoplastic polymer. The thermoplastic compound is brought to a temperature in a predetermined range just above and including the softening point temperature of the thermoplastic compound thereby producing a molten thermoplastic compound. The molten thermoplastic compound is forces through a die and an interior cavity is formed therein. The thermoplastic compound undergoes circumferential stretching flow through the die to impart circumferential orientation to at least some of the thermoplastic polymer and the thermoplastic compound undergoes axial stretching flow through the die to impart axial orientations to at least some of the thermoplastic polymer. Thereby a molten oriented thermoplastic compound having a hollow profile is produces. The molten oriented thermoplastic compound is cooled after imparting circumferential and axial orientation to a temperature below the softening point temperature of the thermoplastic compound to preserve the imparted orientation therein and to solidify the thermoplastic compound. Optionally the process may include the steps of axial cutting the molten oriented thermoplastic compound and gradually flattening the cut molten oriented thermoplastic compound into a sheet having biaxially oriented compounds and whereby during cooling the sheet is solidified.

In another aspect of the invention there is provided a device for manufacturing thermoplastic product having biaxially oriented components. The device comprises a reservoir for bringing the thermoplastic compound to a temperature in a predetermined range just above and including the softening point temperature of the thermoplastic compound. Downstream thereof is a die having internal walls, an inlet, an outlet and a passage communicating between the inlet and outlet. The circumference of the outlet is greater than that of the inlet. A contoured portion of the internal walls define a contoured passageway having an inlet and an outlet, wherein in use the thermoplastic compound undergoes axial stretching flow through the passageway to impart axial orientation to at least some of the thermoplastic polymer. A mandrel is positioned in the die and extends through the contoured passageway. The mandrel has external walls and a contoured portion in registration with the contoured portion of the die. The cross sectional area of the inlet of the contoured passageway is greater than the outlet and wherein in use the mandrel causes a cavity to be formed in the thermoplastic compound to produce a hollow profile and the thermoplastic compound undergoes circumferential stretching flow through the contoured passageway to impart circumferential orientation to at least some of the thermoplastic polymer. There is provided support for the mandrel. An extruder forces the thermoplastic compound through the die. The device also comprises a cooling means downstream of the passageway for cooling the thermoplastic compound.

BRIEF DESCRIPTION OF THE DRAWING

The process and apparatus forming the present invention will now be described, by way of example only, reference being made to the accompanying drawings in which.

DETAILED DESCRIPTION OF THE INVENTION

In the present process a thermoplastic/filler composite material is continuously extruded from an extruder through a die assembly comprised of an adapter, a reservoir, a mandrel, a mandrel support, a die and a calibrator. The adapter joins the extruder to the rest of the die assembly. The reservoir is an extended tubular section and in the reservoir the composite material is allowed to stabilize. As well, in the reservoir the temperature of the bulk composite material is adjusted to the desired deformation temperature for biaxial orientation of the polymer molecules and fibrous filler particulates. Lubricant is distributed evenly at interfaces between the internal surface of the reservoir and the composite material thus reducing shear at interfaces and promoting plug flow with homogeneous speed. The mandrel serves two purposes: firstly the portion of the mandrel in the reservoir serves to convert the flow of the molten composite material from the extruder to an annular flow before entering the die and secondly the portion of the mandrel in the die determines the flow channel in the die in conjunction with the contour of the die. Liquid lubricant is also introduced to the interfaces between the composite material and the internal surface of the die and between the composite material and the external surface of the mandrel by injecting lubricant through channels in the mandrel holder or adapter. Both spider or spiral type of mandrel are common, but spiral mandrel is preferred because it is structurally more sturdy and it can prevent weld lines along the pipe/tube which can cause weak points in the radial direction. The temperature of the reservoir housing and portion of the mandrel in the reservoir are usually set below the temperature of the bulk composite material to provide cooling to the bulk composite material. The dimensions and contours of the mandrel and the die induce elongational flow (rather than shear flow) in both the axial and circumferential directions which are essential for orienting polymer molecules and filler particulates in both directions. To facilitate the alignment of the polymer molecules and the filler particulates, the temperature of the bulk composite must be above the softening point of the polymer. To retain the orientation the composite must be rapidly frozen/solidified, thus, the temperature of the bulk composite must be close to the solidification temperature as it goes through the die. The preferred temperature of the bulk is 1°–10° C. above the melting point or softening point of the polymer. Solidification is achieved by strain hardening of the polymer during biaxial stretching as well as additional cooling provided in the calibrator located next to the die assembly. The final dimension of the product is maintained in the calibrator. Vacuum calibrators may be used to further improve product quality and are desirable if the tolerance of the final dimension of the hollow product is critical. Biaxially oriented sheet can be produced by modifying the die and calibrator in which the annular flow of a circular pipe near the end of the die is cut in the axial direction and gradually converted into a sheet.

Apparatus and Method for Producing Hollow Products

Figure 1:
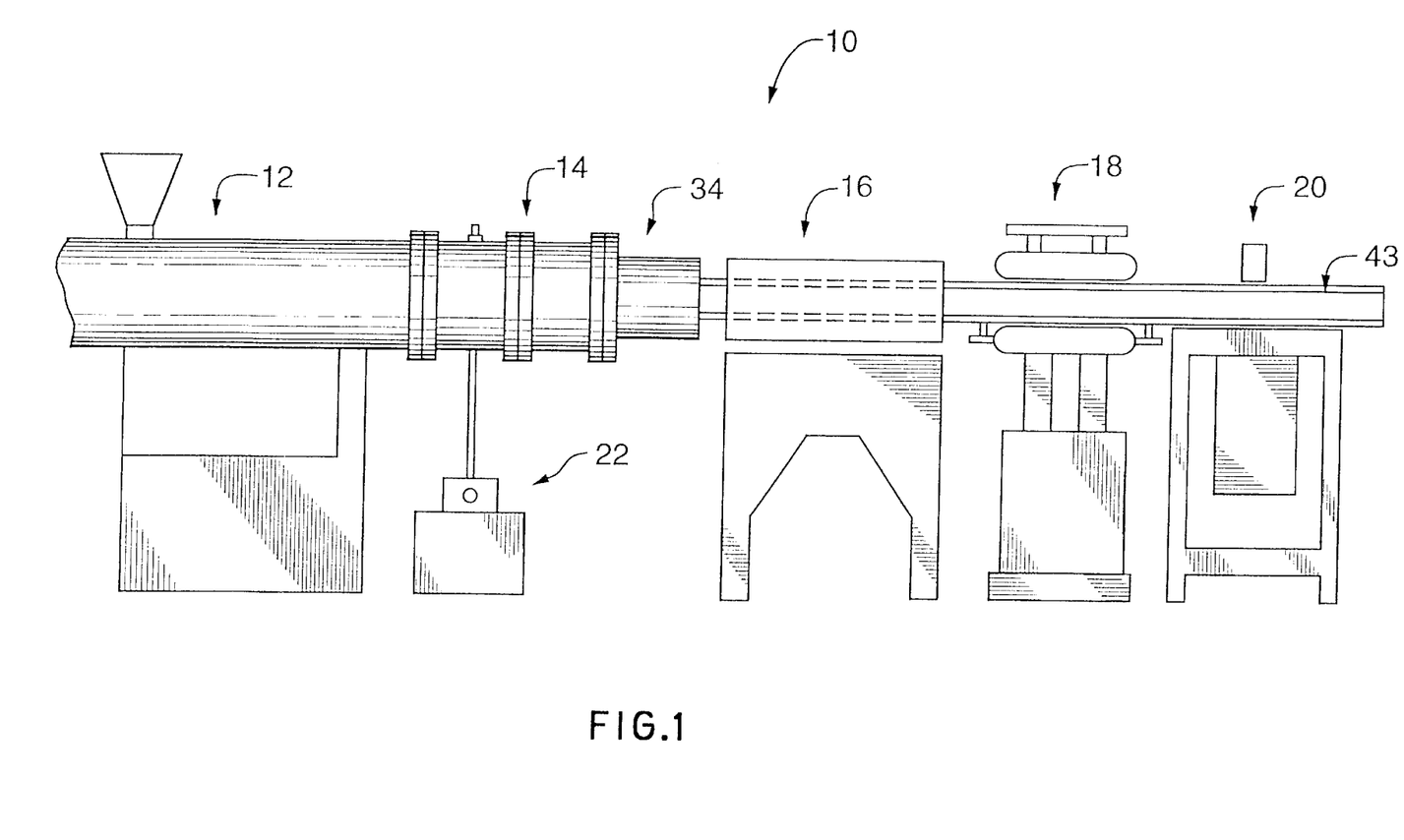
FIG. 1 is an elevational view of an apparatus for producing biaxially oriented, filler reinforced thermoplastic composite hollow profiles in accordance with the present invention.

Referring first to FIG. 1 there is illustrated an apparatus 10 for producing biaxially oriented hollow products made of filler reinforced thermoplastic composites using the process of the present invention. The apparatus consists of, in sequence moving downstream, an extruder 12, a die assembly 14, a cooler or vacuum tank 16, a puller 18, a cut-off saw 20 and a lubricant pump 22.

Figure 2:
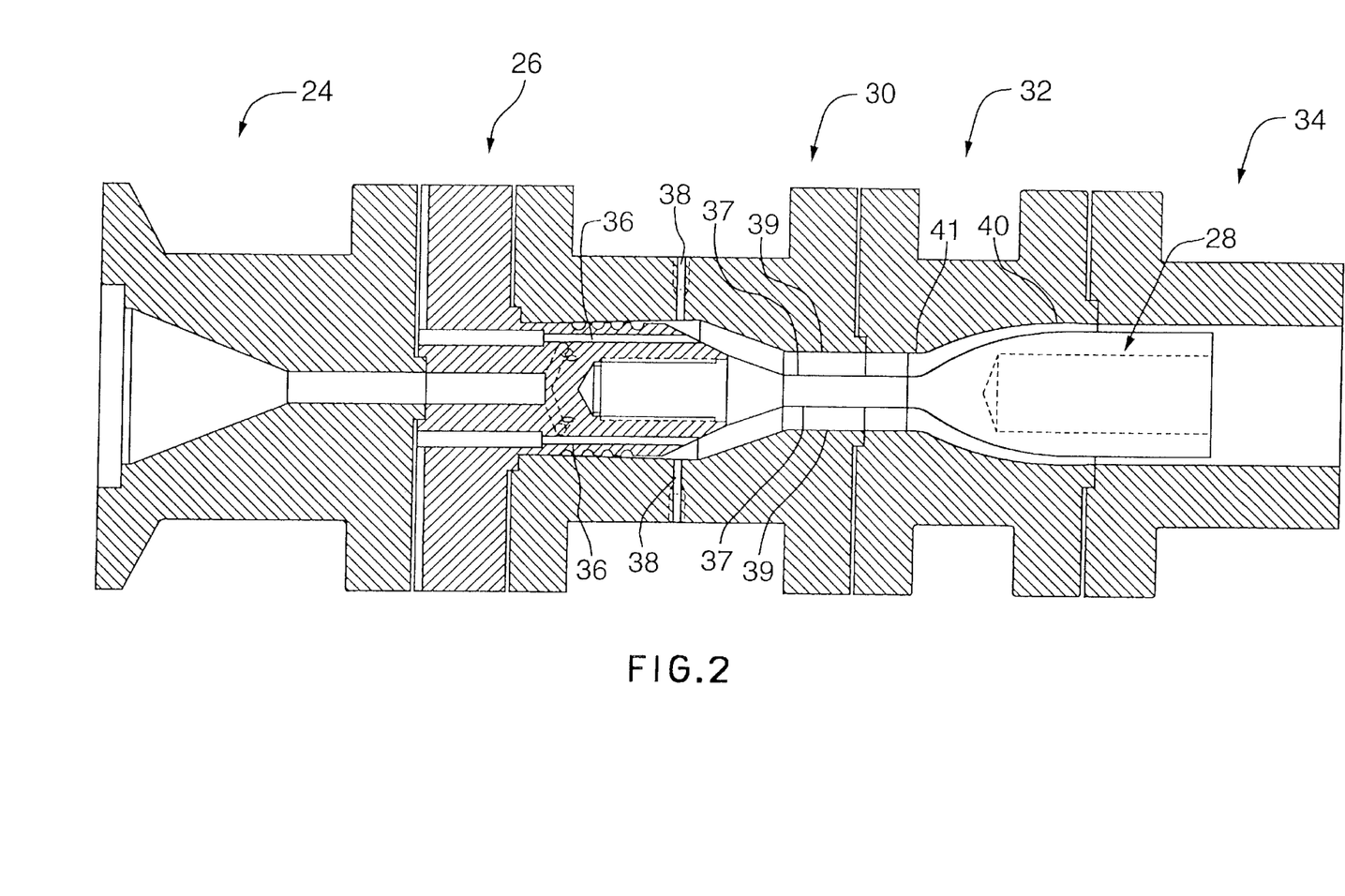
FIG. 2 is a detailed cross-sectional view of a portion of the apparatus in FIG. 1, namely a die assembly employing a spiral mandrel support.

Extruder 12, which may be one of many different types including single or twin screw extruders known to those skilled in the art, is used to melt and convey the plastic composite material through a passageway in the die assembly 14 shown in detail in FIG. 2. The processing conditions in extruder 12 are chosen to ensure that the composite material is completely melted and mixed without causing excessive torque to the extruder drive.

FIG. 2 shows a cross-section of die assembly 14 having a spiral type mandrel support. By way of example, die assembly 14 is configured for producing a circular pipe product using the process of the present invention, however it will be appreciated by those skilled in the art that this process applies to a variety of configurations. Die assembly 14 comprises an adapter section 24 attached to the end of the extruder barrel (not shown), a spiral type mandrel support 26, a mandrel 28, a reservoir 30, a die 32 and a calibrator 34. The conveying action of the extruder screw located in the extruder barrel forces the molten filler/thermoplastic composite through a breaker plate (not shown) into adapter section 24.

The shape of adapter section 24 is designed so that it can be attached at its upstream end to the extruder barrel by any means known in the art so that there is a gradual transition from the upstream section to the downstream section of adapter 24. The downstream section of adapter 24 is attached to mandrel support 26 which in turn supports mandrel 28.

Mandrel 28 determines the internal shape of the hollow profile along the die assembly 14. Mandrel support 26 is a typical spiral mandrel support. Spiral mandrel support 26 creates more uniform distribution of material than other conventional mandrel supports without any weld lines. Lubricant is injected through channel 36 to the interface between the external surface 37 of the mandrel 28 and the composite material. Lubricant is injected through channel 38 to the interface between the internal surface 39 of reservoir 30 and the composite material. Channels 36, 38 are preferably shaped and dimensioned to ensure that the lubricant is distributed evenly around both interfaces, thereby coating both surfaces of the composite material. A lubricant may also be mixed in the thermoplastic/filler composite. Typically, the temperature of the reservoir 30 and the mandrel 28 in the reservoir section are set close to the softening point temperature of the bulk composite material.

As illustrated in FIG. 1, the lubricant may be injected by a device 22 such as a metering pump, syringe pump, gear pump or other apparatus known in the art which can consistently deliver the necessary amount of lubricant at a sufficiently high pressure to overcome the pressure inside reservoir. The lubricant is used to ensure that the annular flow through the die assembly 14 is mainly plug or elongational flow (minimal shear flow). Suitable lubricants include silicone oils (Dow Corning Inc.), liquid paraffins, glycerol, fatty amides (Kenrich Chemical Co.) and titanates.

The length of the reservoir or straight section 30 is chosen so that there is sufficient time for the lubricant to spread evenly around the interfaces between the inside of reservoir 30 and the composite material and the outside of mandrel 28 and the composite material. In addition, reservoir 30 must be of sufficient length to ensure that the composite material enters die 32 at the desired temperature and that the temperature of the thermoplastic/filler composite is as uniform as possible throughout its cross-section.

The design of die 32 is important to the success of the process. First, the exit section 40 of die 32 must correspond to the section of the desired profile. Second, the dimensions or contour of die 32 and the contour of mandrel 28 must be carefully designed in order to create biaxial orientation, while maximizing the throughput and optimizing the surface appearance of the skin. The internal shape of die 32 at the exit 40 will define the external shape of the hollow profile and the external shape of the mandrel 28 at the exit 40 will define the internal shape of the hollow profile. The following paragraphs illustrate the important aspects in designing die 32. A circular hollow profile is used as an example to simplify the illustration, but it will be appreciated by those skilled in the art that these principles apply to any other shapes (rectangular, triangle, etc.).

Figure 3A:
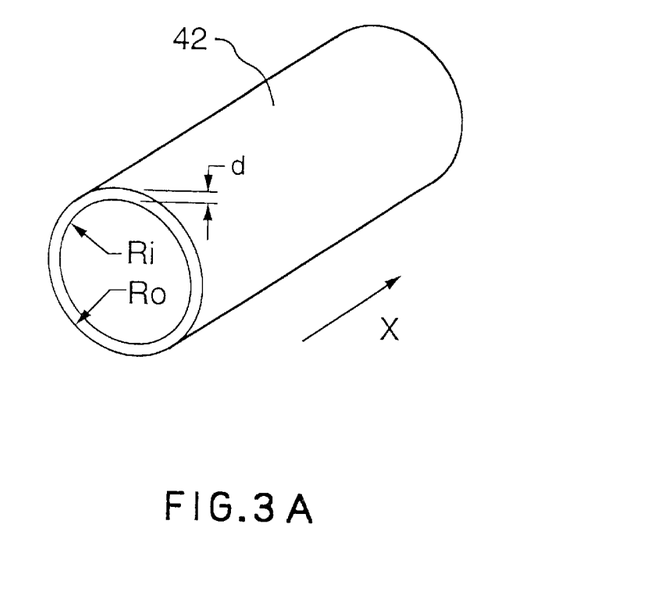
FIG. 3a illustrates a pipe with internal and external radii of $R_i$ and $R_o$ respectively and wall thickness d (where d is significantly smaller than $R_i$ or $R_o$), elongated in the x direction.

FIG. 3(a) shows a diagram of a pipe 42 with internal and external radii of R and $R_o$ respectively and wall thickness $d = R_o - R_i$. Pipe 42 is elongated in the x direction. The term biaxial orientation refers to orientation in x direction and in the circumferential direction. To manufacture pipe with biaxially oriented components, the thermoplastic/filler composite material must experience elongational or stretching flow (not shear flow) in two directions. The stretching flow in the x (axial) direction is caused by diminishing bulk cross-sectional area of the tube/pipe along x direction. Bulk cross-sectional area is defined as the area of the bulk profile normal to the axial or x direction. For a pipe, it can be calculated as $\pi(R_o^{22} - R_i^2)$. The stretch (draw) ratio in x or axial direction is defined as the ratio of the bulk cross-sectional areas of the entrance and the exit of the die. The stretching flow in the circumferential direction is caused by increasing the circumference of the die from the entrance to the exit of the die. The circumferential stretch (draw) ratio is defined as the ratio of the average circumferences (or average radii) at the exit and the entrance of the die. The circumference can be calculated from $2\pi R$, where R is radius. The term average refers to intermediate between internal and external values, $R = (R_o + R_i)/2$. Therefore, the criteria for a die of the present invention, which causes the polymer components to be biaxially oriented during the process, is that the radius or circumference of the die opening is greater at the exit 40 (FIG. 2) than at the entrance 41 and the bulk cross-sectional area is greater at the entrance 41 than at the exit 40. Axial stretch ratios are typically 1.25:1 to 4:1. Similarly, circumferential stretch ratios are typically 1.25:1 to 4:1.

Another important criteria for a successful biaxial orientation process is the stretch rates (the speed of stretching) in both orientation directions. Along with the material properties, in particular the rheological properties, the stretch rates and the stretch ratios in both directions determine the contour of the die housing and the mandrel. The best results are usually obtained for a design which impart constant or decreasing stretch rates. To achieve stretching, i.e., through elongational flow, lubricant at the interfaces between the composite material and the metal surfaces of die 32 and mandrel 28 is required. Otherwise, shear flow, which is not effective for stretching, will dominate.

The final element of die assembly 14 is calibrator 34, which has the same cross-section as the adjacent exit 40 of the die 32 and consequently the same section as the desired profile of the product. The portion of mandrel 28 with a constant cross-section extends into the calibrator 34 partially or all the way. The main function of calibrator 34 is to maintain the dimensional stability of the hollow profile. Vacuum calibrator or vacuum tank 16 (FIG. 1) may be used at the end of the die assembly if the tolerances of the dimension of the final product are critical.

The temperature of die 32 and preferably, also the temperature of the composite material entering the die 32 is generally a few degrees above the softening point of the resin mixture, that is 1°–10° C. preferably 2°–5° C. above the softening point. The composite material is partially solidified as it exits the die section due to strain hardening resulting from stretching the material in the die. Further solidification takes place in calibrator 34. Rapid cooling is necessary to preserve the imparted orientation of the polymer molecules and the filler particulates. If desired a cooler or vacuum tank 16 may be used, see FIG. 1.

Referring to FIG. 1, after solidification to the desired dimension, the biaxially oriented hollow extrudate 43 is passed through a puller 18 which guides it to the cut-off saw 20. The puller 18 only acts as a guide to ensure a straight product and does not provide tension nor does it assist the composite material in going through die assembly 14. Tension will cause tensile failure in the extrudate due to the low melt strength of highly filled composite material.

Figure 4:
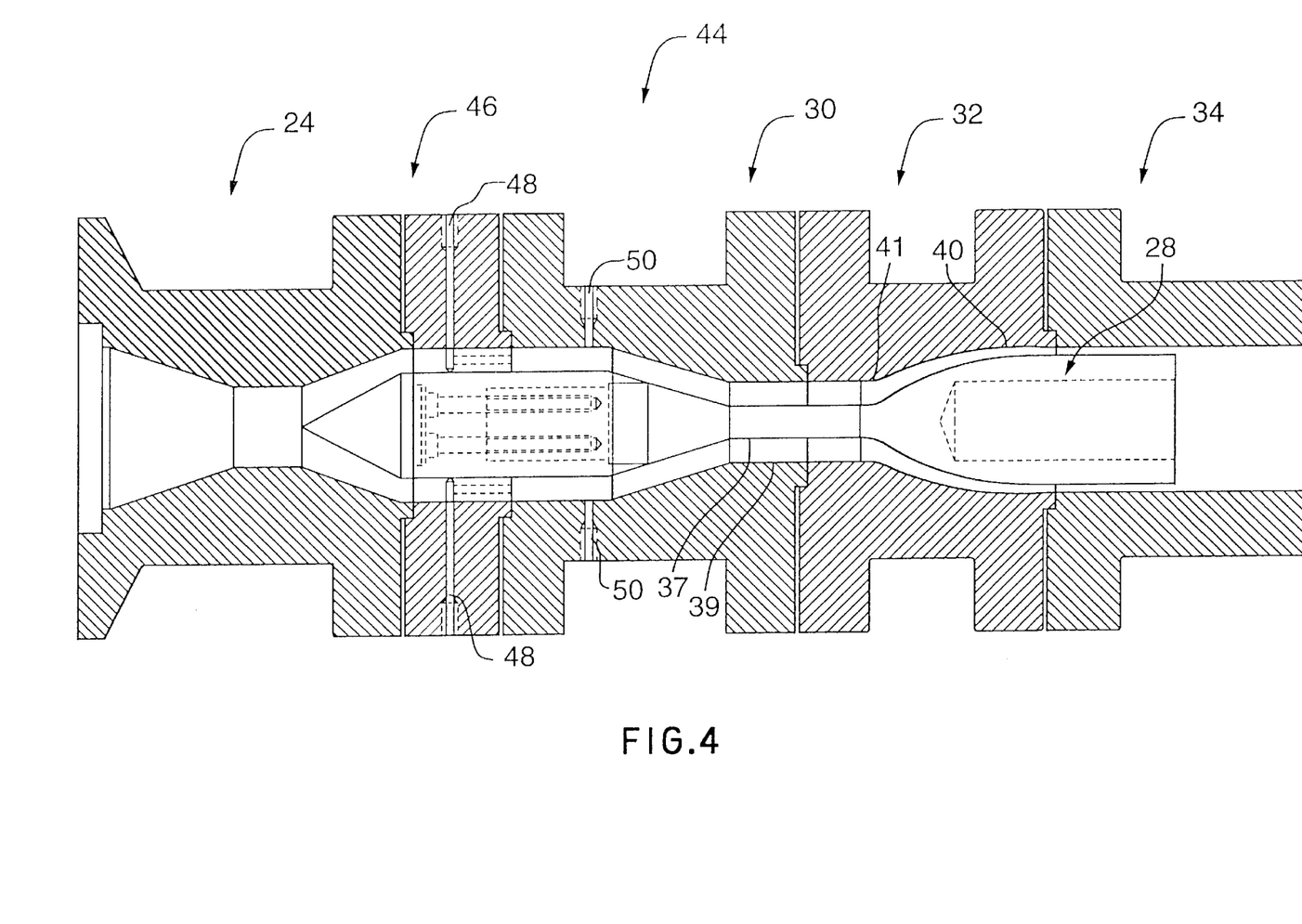
FIG. 4 is a detailed cross-sectional view of a portion of the apparatus in FIG. 1, namely a die assembly employing a spider mandrel support.

An alternate embodiment of the die assembly is shown in FIG. 4 at 44. FIG. 4 shows a longitudinal cross-section of die assembly 44 having a spider type mandrel support. Die assembly 44 is generally the same as that described above and only those portions which are different will be described and assigned different designation numbers.

Mandrel support 46 is a typical spider type support. Spider mandrel support 46 is much simpler in design, but the spider legs may cause weld lines in the product and thus weak spots. Lubricant is injected through channel 48 to the interface between the external surface of the mandrel 28 and the composite material. Lubricant is injected through channel 50 to the interface between the internal surface of reservoir 30 and the composite material. Channels 48, 50 are preferably shaped and dimensioned to ensure that the lubricant is distributed evenly around both interfaces, thereby coating both surfaces of the composite material.

Apparatus and Method for Producing Biaxially Oriented Sheets

Figure 3B:
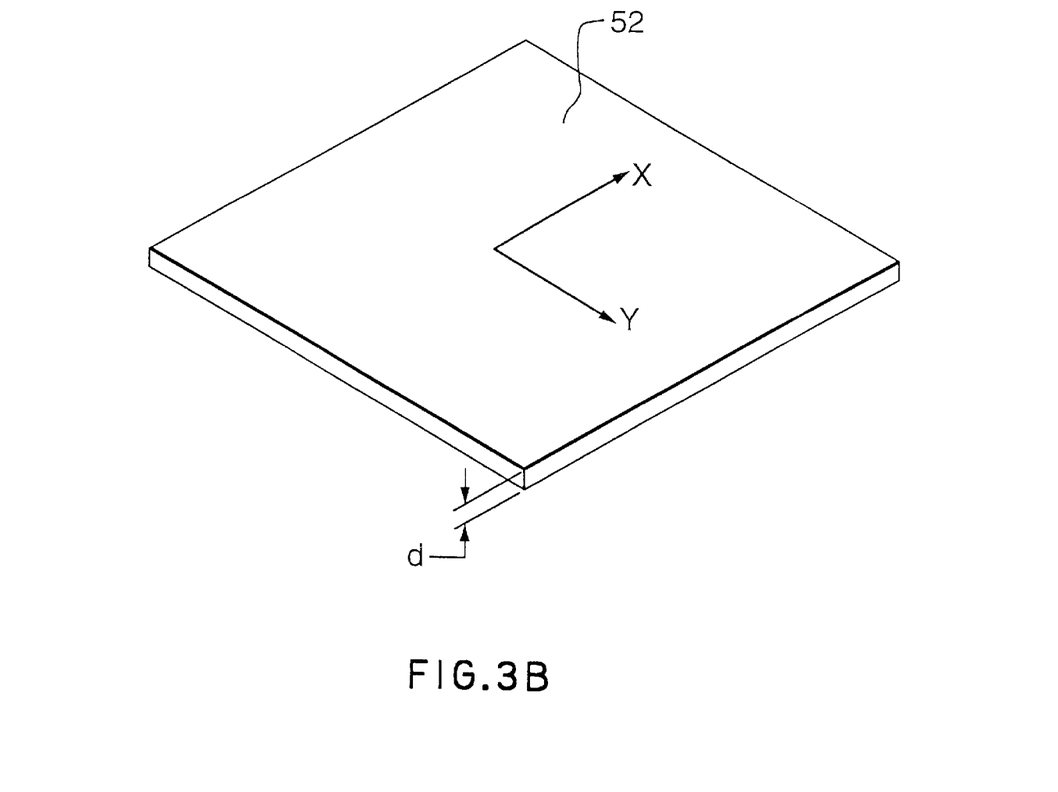
FIG. 3b illustrates a thin sheet with width 2 $\pi$R and thickness d (where R is approximately $R_i$ or $R_o$ and d is significantly smaller than R) resulted from cutting and flattening the pipe shown in FIG. 3a and having coordinates x and y.

Referring to FIG. 3a) and b), cutting biaxially oriented pipe 42 along the axial direction and flattening it into a sheet 52 results in a biaxially oriented sheet of the same thickness as the wall of the pipe. The orientation in the axial direction remains the orientation in the x direction, while the orientation in the circumferential direction of the pipe becomes the orientation in the y direction, where y is perpendicular to x. Therefore, if a pipe is cut along the x direction and opened-up into a flat sheet, the biaxial orientation becomes apparent in x and y coordinates.

Figure 5:
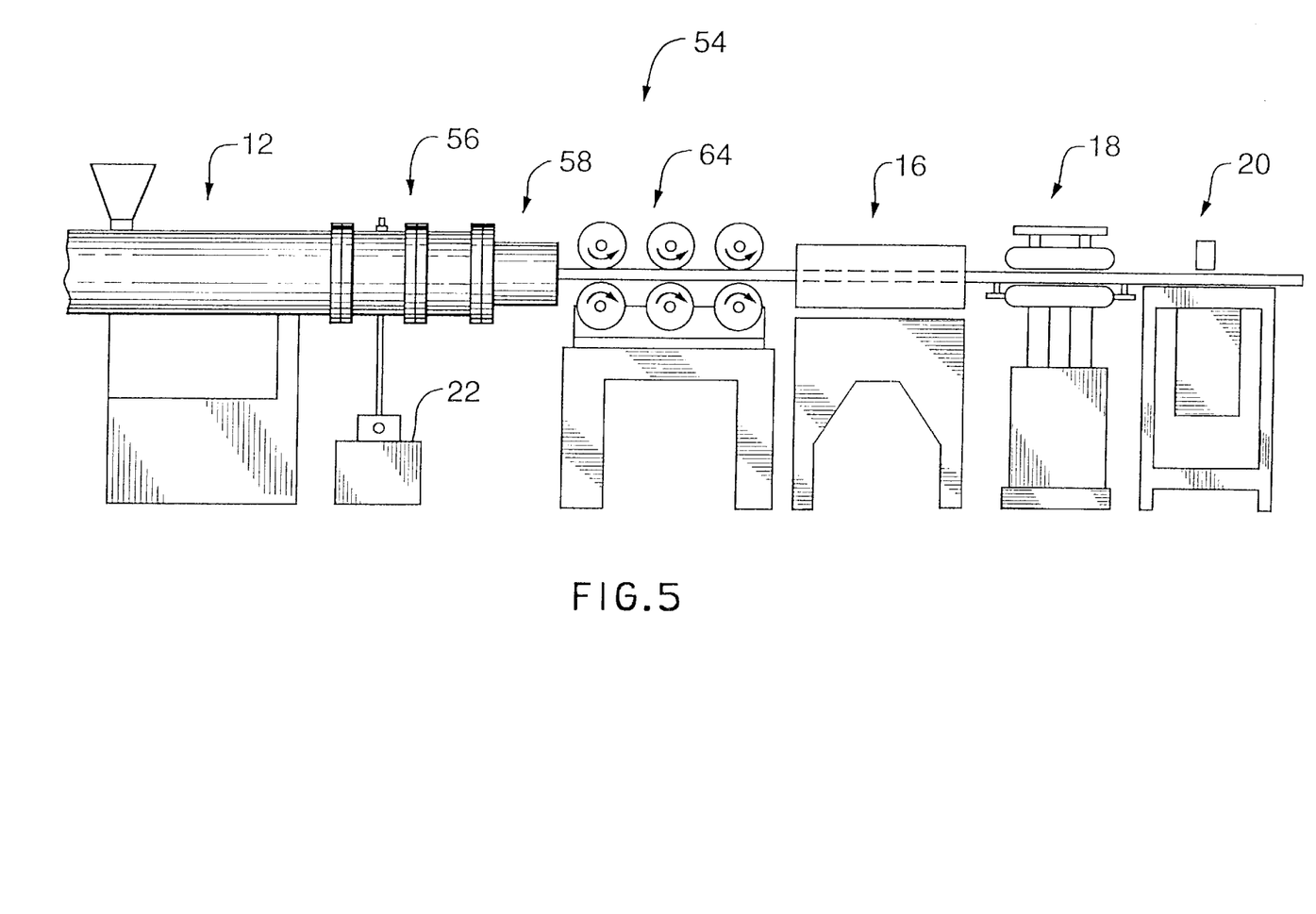
FIG. 5 is an elevational view of an apparatus for producing biaxially oriented, filler reinforced thermoplastic composite sheets in accordance with the present invention.

FIG. 5 shows an apparatus 54 for producing biaxially oriented sheets. Generally, biaxially oriented sheets can be manufactured using similar equipment as that used to manufacture biaxially oriented pipe described above, with some modifications to accommodate the principle of converting a pipe into a sheet. Only those differences will now be discussed.

Extruder 12, cooler or vacuum tank 16, puller 18, cut off saw 20 and lubricant pump 22 are the same as for the biaxially oriented pipe described above and shown in FIG. 1. Die assembly 56 includes those parts of die assembly 10 described above and shown in FIG. 2 in sequence from the adapter 24 to the die exit 40. However, instead of a calibrator 34 a transformation section 58 (FIG. 6) is attached to the end of die 32 not shown in FIG. 5. This transformation section 58 converts the flow of the composite material from a pipe 60 into increasingly open pipes, and finally into a flat sheet 62.

Figure 6:
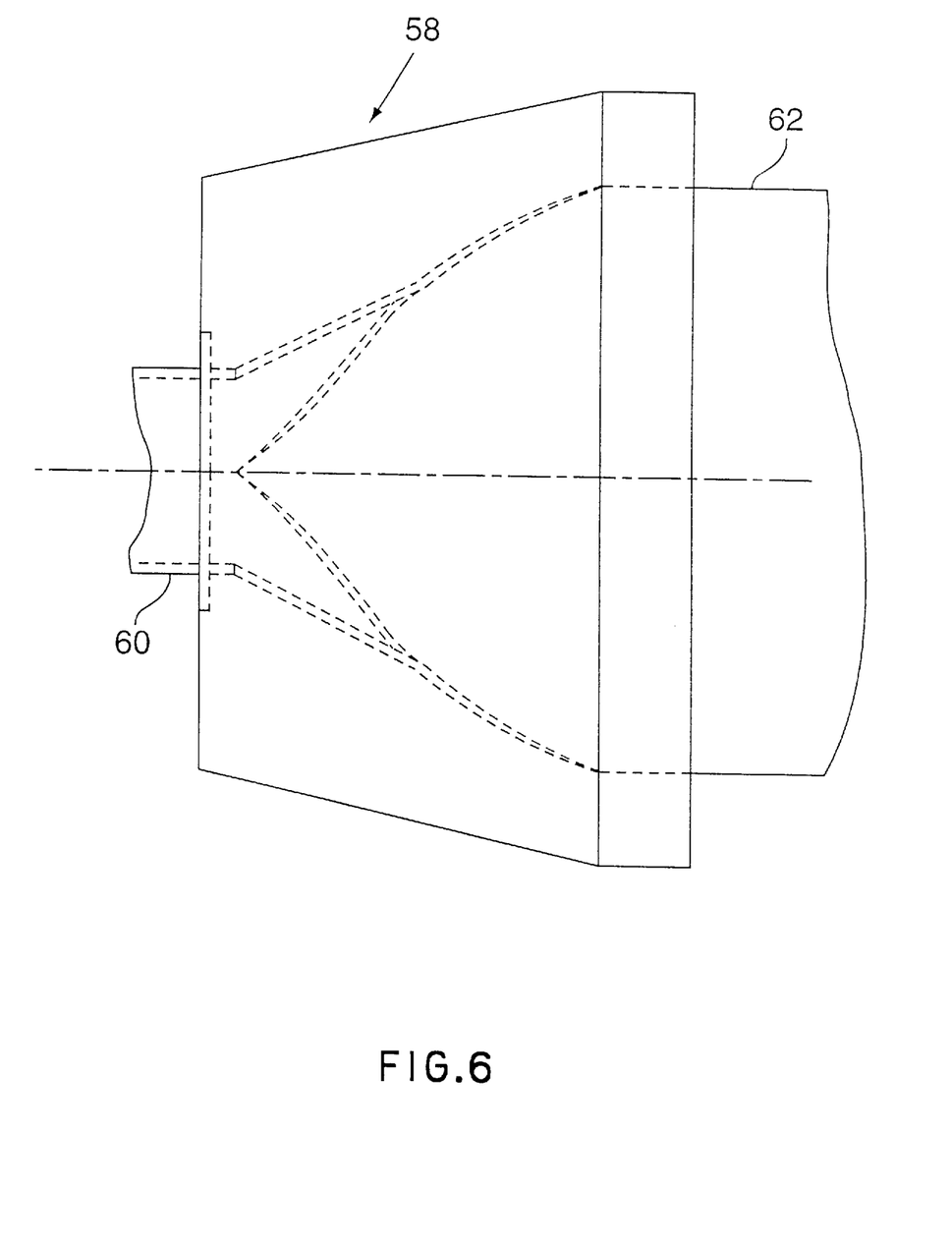
FIG. 6 is a top view of a portion of the apparatus in FIG. 5, namely the transformation section used to transform a biaxially oriented pipe into a biaxially oriented sheet.

Several pairs of rollers 64 (shown in FIG. 5) are located after the transformation section 58 to flatten the partially open pipe into sheet and/or to maintain the sheet flat before entering cooling bath 16, puller 18 and cut-off saw 20. FIG. 6 illustrates a schematic diagram of transformation section 58 and shows a pipe 60 entering transformation section 58 and a planar sheet 62 exiting transformation section 58.

Figure 7:
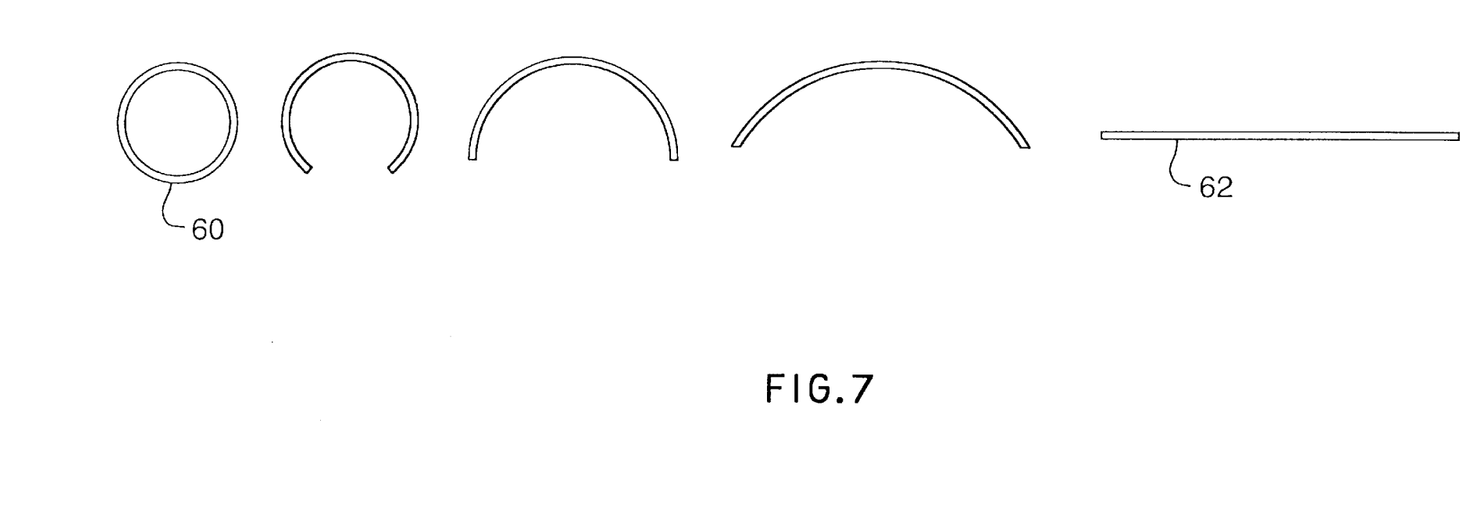
FIG. 7 illustrates a series of cross sectional view which show the gradual transformation of the hollow profile from a pipe to a sheet as the material passes through the transformation section of FIG. 6.

As discussed above, the principle is to gradually convert the pipe into a sheet having a constant bulk cross-sectional area. Since the wall thickness of the pipe or the thickness of the resulting sheet is small compared to the diameter of the pipe, this transformation does not result in failure on the surface of the sheet. FIG. 7 shows stages in the gradual transformation of the profile from a circular pipe 60 to a planar sheet 62 at several locations along the machine direction. During this transformation, the composite material is cooled down to freeze the orientations created in the die and to condition the material for the rolling step.

Selection and Pre-treatment of Starting Materials

The resin component may comprise virgin or recycled (waste) thermoplastics derived from the polyolefin family (polyethylenes, polypropylenes and copolymers thereof), vinyls (chiefly copolymers of vinyl chloride), styrenics (including ABS and maleic anhydride copolymers), polyesters (including polyethyleneterephthalate and polybutyleneterephthalate), polycarbonates and polyamides (nylons). The process can be carried out with recycled or waste resins including commingled resins. For economic reasons, the granulated (chipped) resins recovered from plastic bottles or film (prior to pelletizing) are preferred since pelletizing greatly increases the material cost. This process excludes thermosetting resins such as phenolics, formaldehydes, polyesters and epoxy resins. For best results it is desirable to employ resins having a large melt strength so that the material can survive high stretching ratio without tensile failure. Since melt strength (and strain hardening) increases as the temperature is decreased, it is desirable to extrude near its softening point, where the viscosity is high. There is a lower limit to the temperature as the extrudate becomes too viscous to extrude and the pressures become excessive. The high viscosity near the softening point is also retained for a sufficiently long period of time (at least several minutes) so that the molten extrudate has sufficient time to solidify and freeze the polymer orientation imparted by the die. In the case of melt extrusion as normally practised in industry the relaxation times of the extrudates are often measured in seconds so that the majority of the flow orientation is lost before the extrudate has solidified. Long relaxation times and pure elastic deformation (as opposed to viscous deformation) are also favoured by the use of high molecular weight resins. The choice of molecular weight of the polymer may be limited depending on the ability of the latter to be mixed with the filler so that a compromise is usually necessary between the ease of mixing and retention time of orientation in the extrudate. Therefore the highest molecular weight consistent with the ease of mixing is normally preferred.

The filler content may be inorganic or cellulosic that are in the form of fine particulates or short fibres before mixing with the thermoplastics. Inorganic reinforcing fillers, i.e., filler particulates/fibres with aspect ratios (ratio of length to diameter) greater than four, are preferred. The inorganic filler may include mica and talc flakes, short glass and carbon fibres, calcium carbonate and clay. The cellulosic filler material may be derived from wood/forest by-products and wastes, such as saw dust, wood flour or ground wood and ground paper (newspaper and cardboard) and agricultural by-products such as ground rice hulls, straws, corn husks etc.

High intensity thermokinetic mixing is used in the process of the present invention, discussed further below, in order to disperse and further disintegrate filler particulates into tiny fragments. As a result, the quality of the fibre composite is not particularly critical and even very short fibres may be usefully employed that may be otherwise be considered of no commercial value, for example waste sludge from paper recycling and fines from pulp mills. Techniques to produce fine, but free flowing, reinforcing filler are already well known. A weighed quantity of filler is admixed with an appropriate resin and subjected to intensive mixing in a thermokinetic mixer, such as a Gelimat (Draiswerke) and K-Mixer (Synergistics), or twin screw kneader or extruder. This intensive mixing not only separates the loosely bonded fibres/particulates from each other but further disintegrates the individual fibre/particulates into a smaller size. It is sometimes necessary to employ dispersing/coupling agents in order to disperse and compatibilize the non-polar resin with highly polar filler components. These surfactants preferentially wet the surface of the fibres/particulates (thereby, increasing the degree of dispersion) and provide increased adhesion (coupling) between the surface of the fibres/particulates and the polymer matrix. It has been found useful to employ carboxylated or maleated polyolefins as dispersing agents and/or coupling agents in polyolefin polymers. The quantity of dispersing/coupling agent required depends upon the surface area of the filler component, and is usually 0–5 parts per hundred by weight of the filler constituent. The filler concentration may vary from about 0 to 80% by weight but the mixing becomes difficult at filler concentration greater than 50%.

It will be appreciated by those skilled in the art that the processes of the present invention has been described for a thermoplastic/filler composite material would also apply to a thermoplastic polymer alone. However, preferably the process will be used with a thermoplastic/filler composite material since it can utilize filler.

Therefore what is claimed is:

1. A process for continuous production of a thermoplastic product comprising a thermoplastic compound having biaxially oriented components, comprising the steps of:
   (a) providing a thermoplastic compound comprising orientable thermoplastic polymer;
   (b) bringing the thermoplastic compound to a temperature above and including the softening point temperature of the thermoplastic compound thereby producing a softened thermoplastic compound;
   (c) extruding the softened thermoplastic compound through a die, from a die inlet to a die outlet, and an adjacent downstream cooling zone, wherein the direction from the die inlet to the die outlet defines the axial direction and wherein the circumference of the die outlet is larger than the die inlet and the bulk cross sectional area at the die outlet is less than at the die inlet;
   (d) providing a lubricant between the thermoplastic compound and the die;
   (e) constraining the softened thermoplastic compound in the die to undergo circumferential stretching flow through the die to impart circumferential orientation to at least some of the thermoplastic polymer and constraining the softened thermoplastic compound in the die to undergo axial stretching flow through the die to impart axial orientation to at least some of the thermoplastic polymer, thereby producing a softened biaxially oriented thermoplastic compound having a hollow profile having desired dimensions; and
   (f) cooling the thermoplastic compound having the imparted biaxial orientation in said cooling zone to a temperature below the softening point temperature of the thermoplastic compound to preserve the imparted orientation of the thermoplastic polymer while continuing to constrain the thermoplastic compound to maintain the imparted dimensions.

2. A process according to claim 1 wherein the thermoplastic compound undergoes circumferential stretching flow and axial stretching flow concurrently.

3. A process according to claim 2 wherein the circumferential stretching flow and the axial stretching flow have stretch rates that are in a predetermined range including constant and decreasing stretch rates.

4. A process according to claim 2 further comprising the steps of axial cutting the hollow profile of the desired dimensions and gradually flattening the cut hollow profile into a sheet having biaxially oriented compounds and desired dimensions whereby in the cooling zone the sheet is solidified.

5. A process according to claim 4 wherein the hollow profile is a circular pipe.

6. A process according to claim 4 wherein the circumferential stretching flow has a decreasing stretch rate.

7. A process according to claim 2 wherein the thermoplastic compound of step (a) includes a filler, having an aspect ratio greater than unity, intimately mixed with the thermoplastic polymer, and the circumferential and axial stretching flow through the die imparts circumferential and axial orientation respectively to at least some of the filler.

8. A process according to claim 4 wherein the thermoplastic compound of step (a) includes a filler, having an aspect ratio greater than unity, intimately mixed with the thermoplastic polymer, and the circumferential and axial stretching flow through the die imparts circumferential and axial orientation respectively to at least some of the filler.

9. A process according to claim 4 wherein the circumferential stretching flow has a constant stretch rate.

10. A process according to claim 6 wherein the axial stretching flow has a decreasing stretch rate.

11. A process according to claim 6 wherein the axial stretching flow has a constant stretch rate.

12. A process according to claim 9 wherein the axial stretching flow has a decreasing stretch rate.

13. A process according to claim 9 wherein the axial stretching flow has a constant stretch rate.

* * * * *